US012435873B2

(12) United States Patent
Kawashima et al.

(10) Patent No.: US 12,435,873 B2
(45) Date of Patent: Oct. 7, 2025

(54) RADIANT TUBE (71) Applicant: JFE Steel Corporation, Tokyo (JP)

(72) Inventors: Tomoyuki Kawashima, Tokyo (JP);
Akihiro Kobayashi, Tokyo (JP);
Noriko Ozawa, Tokyo (JP)

(73) Assignee: JFE Steel Corporation, Tokyo (JP)

(*) Notice: Subject to any disclaimer, the term of this patent is extended or adjusted under 35 U.S.C. 154(b) by 543 days.

(21) Appl. No.: 17/799,726

(22) PCT Filed: Feb. 3, 2021

(86) PCT No.: PCT/JP2021/003974
§ 371 (c)(1),
(2) Date: Aug. 15, 2022

(87) PCT Pub. No.: WO2021/166651
PCT Pub. Date: Aug. 26, 2021

(65) Prior Publication Data
US 2023/0071781 A1    Mar. 9, 2023

(30) Foreign Application Priority Data

Feb. 21, 2020 (JP) ................. 2020-028033

(51) Int. Cl.
*F23D 14/12* (2006.01)
*F23C 3/00* (2006.01)
*F28F 13/12* (2006.01)

(52) U.S. Cl.
CPC ............ *F23D 14/12* (2013.01); *F23C 3/00* (2013.01); *F28F 13/12* (2013.01)

(58) Field of Classification Search
CPC ............ F23D 14/12; F23C 3/00; F28F 13/12
(Continued)

(56) References Cited

U.S. PATENT DOCUMENTS 2,253,920 A     8/1941  Vaughan
2,726,681 A *  12/1955  Gaddis ................ F28F 1/40
                                                        138/38
(Continued)

FOREIGN PATENT DOCUMENTS

JP    S57-112694 A    7/1982
JP    S58-52475 U1    4/1983
(Continued)

OTHER PUBLICATIONS

Extended European Search Report dated Jul. 17, 2023, of counterpart European Patent Application No. 21757979.6.
(Continued)

*Primary Examiner* — Avinash A Savani
(74) *Attorney, Agent, or Firm* — DLA Piper LLP (US)

(57) ABSTRACT

A radiant tube includes a conduit; and one or more heat transfer promoters disposed in the conduit, wherein the heat transfer promoter includes a body part on a center side of the conduit, and protruding parts protruding from the body part toward an inner wall surface of the conduit, the protruding parts are on an outer periphery of the body part to be arranged in a circumferential direction of the conduit, the protruding parts includes first protruding parts having a distal end portion facing the inner wall surface across a gap $\Delta L$, and a second protruding part, the number of first protruding parts is greater than the number of second protruding parts, and a ratio ($\Delta L/Dt$) of the gap $\Delta L$ to an equivalent diameter Dt of a conduit portion is x %, where the heat transfer promoter is disposed, and formula (1) is satisfied: $0.3\% < x < 7\%$.

20 Claims, 7 Drawing Sheets

(58) Field of Classification Search
USPC .......................................... 431/110; 165/179
See application file for complete search history.

(56) References Cited

U.S. PATENT DOCUMENTS

| | | | |
|---|---|---|---|
| 3,036,818 A | 5/1962 | Legrand | |
| 3,920,383 A | 11/1975 | Kerr | |
| 4,090,559 A * | 5/1978 | Megerlin | F28F 13/12 |
| | | | 138/38 |
| 4,657,074 A * | 4/1987 | Tomita | F28F 1/422 |
| | | | 165/DIG. 520 |
| 4,809,672 A * | 3/1989 | Kendall | F23C 3/002 |
| | | | 126/91 A |
| 2005/0269069 A1 * | 12/2005 | Hancock | F22B 37/12 |
| | | | 165/179 |

FOREIGN PATENT DOCUMENTS

| | | |
|---|---|---|
| JP | S58-63421 A | 4/1983 |
| JP | S63-173613 U | 11/1988 |
| JP | 2017-83127 A | 5/2017 |
| JP | 2019-86180 A | 6/2019 |

OTHER PUBLICATIONS

An English translation of the International Preliminary Report on Patentability and Written Opinion dated Sep. 1, 2022, of counterpart PCT International Application No. PCT/JP2021/003974.
International Search Report dated Mar. 9, 2021 in counterpart International Application No. PCT/JP2021/003974.
Written Opinion dated Mar. 9, 2021 in counterpart International Application No. PCT/JP2021/003974.

* cited by examiner

RADIANT TUBE

TECHNICAL FIELD

This disclosure relates to a radiant tube that includes a heat transfer promoter.

BACKGROUND

The radiant tube includes a conduit forming a tube body, and a gas generating part such as a burner disposed on the inlet side of the conduit and generates a combustion gas. The radiant tube indirectly heats an object to be heated that is present outside the conduit, by the radiant heat from the conduit heated by the combustion gas generated by the gas generating part.

In the radiant tube, the combustion gas generated by the gas generating part flows along a gas flow passage formed by the conduit. Consequently, the conduit is in a high temperature state due to the heat transfer from the combustion gas. In this event, in the radiant tube, on the outlet side (the downstream side) of the conduit where the heat transfer from the combustion gas to the conduit proceeds so that the temperature of the combustion gas is lowered, the amount of radiant heat transfer is reduced so that the surface temperature of the conduit is lowered. Therefore, there are instances where, to enhance the heat transfer efficiency from the combustion gas to the conduit on the downstream side (the outlet side) of the conduit of the radiant tube to increase the heat utilization rate of the radiant tube, a heat transfer promoter is disposed on the downstream side of the conduit.

For example, JP S57-112694 A discloses a configuration in which a heat transfer promoter is disposed in the latter half of a conduit of a radiant tube, and as the heat transfer promoter, a plate-shaped guide vane is provided that forms the flow passage of a combustion gas into a spiral shape. With that approach, the combustion gas is made to flow to the outlet of the conduit while spirally swirling in the latter half of the conduit of the radiant tube, thereby increasing the relative velocity between the conduit and the combustion gas to increase the convective heat transfer coefficient.

However, with the method described in JP '694, to spirally swirl the combustion gas, it is necessary that the structure of the heat transfer promoter should have a complicated shape. Therefore, the manufacturing cost of the heat transfer promoter described in JP '694 becomes high, and a less expensive heat transfer promoter is required.

On the other hand, JP S63-173613 U discloses a plurality of heat transfer promoters each having four plate-shaped partitions and a cruciform cross section and the cruciform-cross-section heat transfer promoters are fitted in series in a conduit with a phase difference of 45 degrees. With that configuration, since the configuration is obtained by fitting the plurality of heat transfer promoters in the conduit, it is possible to form a spiral gas flow inexpensively. However, with the cruciform-cross-section heat transfer promoters described in JP '613, the heat transfer efficiency cannot be said to be sufficiently high, and further improvement is required.

Further, JP 2017-83127 A proposes a star-shaped heat transfer promoter that can be manufactured inexpensively, wherein the ratio of the cross-sectional area of the heat transfer promoter to the cross-sectional area of a radiant tube, and the ratio of the perimeter of a cross section of the heat transfer promoter to the perimeter of a cross section of the radiant tube are defined to improve the heat transfer efficiency and to suppress an increase in pressure loss due to the insertion of the heat transfer promoter.

JP '127 seeks to improve the heat transfer coefficient by reducing the flow passage area. With that approach, the gas flow velocity in the flow direction along a conduit is improved. However, with that approach, since distal ends of protruding parts forming the heat transfer promoter are in contact with an inner wall surface of the conduit, cross sections of flow passages formed between the adjacent protruding parts are in a state of being separated from each other so that the flow in the swirling direction is suppressed.

That is, in JP '127, the heat transfer promoter has a simple shape and can be manufactured inexpensively, but due to the separation of the individual flow passage cross sections, it is not possible to obtain a large heat transfer coefficient correspondingly. Further, in JP '127, taking into account the operation of an actual radiant tube, the deformation margin in consideration of the thermal deformation of the radiant tube and the heat transfer promoter becomes necessary.

It could therefore be helpful to provide a radiant tube including a heat transfer promoter having a simple structure and is able to further improve heat transfer efficiency.

SUMMARY

We thus provide a radiant tube including: a conduit configured to be heated by a fluid gas flowing in the conduit; and one or two or more heat transfer promoters disposed in the conduit along an axis of the conduit, wherein: the heat transfer promoter includes a body part disposed on a center side of the conduit, and a plurality of protruding parts protruding from the body part toward an inner wall surface of the conduit; the plurality of protruding parts is formed on an outer periphery of the body part to be arranged in a circumferential direction of the conduit; the plurality of protruding parts includes a plurality of first protruding parts each having a distal end portion facing the inner wall surface of the conduit across a gap $\Delta L$, and a second protruding part as a remainder; the number of first protruding parts is set to be greater than the number of second protruding parts; and when a ratio ($\Delta L/Dt$) of the gap $\Delta L$ to an equivalent diameter $Dt$ of a conduit portion, where the heat transfer promoter is disposed, of the conduit is given by x[%] in percentage, a formula (1) is satisfied:

$$0.3\% < x < 7\% \qquad (1).$$

It is thus possible to provide a radiant tube including a heat transfer promoter that can be manufactured inexpensively while improving the heat transfer efficiency.

BRIEF DESCRIPTION OF THE DRAWINGS

FIGS. 4A and 4B are diagrams showing an example in which the heat transfer promoter is provided with a cavity, wherein

REFERENCE SIGNS LIST

1 conduit
1a inner wall surface
2A gas generating part
3 furnace wall
4 heat transfer promoter
41 body part
42 protruding part
42a first protruding part
42b second protruding part
100 radiant tube
R swirling flow
ΔL gap

DETAILED DESCRIPTION

We performed a numerical simulation about the shape of a heat transfer promoter having a plurality of protruding parts like in JP '127, wherein the heat transfer efficiencies of radiant tubes are compared with each other based on the waste heat reduction ratios thereof. Further, we evaluated the pressure loss caused by inserting the heat transfer promoter in a conduit. From the results of the numerical simulation, we found that, to improve the heat transfer efficiency with the heat transfer promoter having the plurality of protruding parts on the outer periphery, it is effective that the distance (gap ΔL) between an inner surface of the conduit of the radiant tube and a distal end of the protruding part of the heat transfer promoter is maintained in a specific ratio.

We further found that it is preferable to simply dispose the heat transfer promoter in the conduit while forming the gap ΔL described above. We thus discovered that, with the configuration described above, the pressure loss is small like with the heat transfer promoter described in JP '127, and further that this heat transfer promoter can be manufactured inexpensively.

The "heat transfer efficiency" refers to the efficiency of, out of heat transferred to a conduit of a radiant tube from a combustion gas and waste heat discharged as sensible heat of an exhaust gas, the heat transferred to the conduit of the radiant tube. When the waste heat that is discharged without being transferred to the conduit from the exhaust gas is reduced, the heat transfer efficiency is improved.

Hereinafter, an example of radiant tubes will be described with reference to the drawings.

The drawings are only exemplary and therefore the ratio of the sizes or lengths of the components, and so on differ from actual ones. Further, the example given below merely exemplifies the configuration embodying our technical ideas, and such technical ideas do not limit the materials, shapes, structures, and so on of the constituent components to those described below. Our technical ideas can be modified in various ways within the technical scope thus disclosed by the appended claims.

Figure 1:
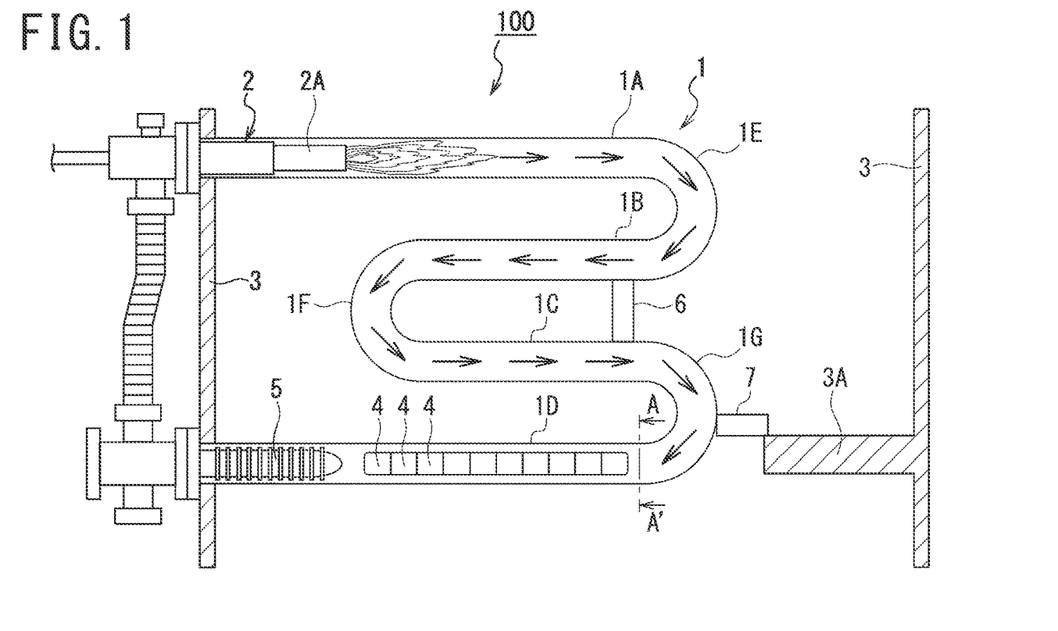
FIG. 1 is a diagram showing the structure of a radiant tube according to an example.

As illustrated in FIG. 1, a radiant tube 100 of this example includes a conduit 1 in which a combustion gas (also a gas) flows, a radiant tube burner 2 that generates a combustion gas in the conduit 1, and a heat transfer promoter 4. The radiant tube 100 may include a waste heat recovery device 5 such as a recuperator or a regenerative burner, or another known component, or may be configured not to include such a component. The recuperator is a device that performs heat exchange between a combustion gas flowing in the radiant tube 100 and combustion air. This example exemplifies when a plurality of heat transfer promoters 4 is coaxially aligned with each other, and protruding parts 42 of the plurality of heat transfer promoters 4 are aligned with each other along the conduit.

Conduit 1

As illustrated in FIG. 1, the conduit 1 of this example has a generally W-shaped winding shape in side view. That is, the conduit 1 includes four straight pipe parts 1A to 1D vertically arranged side by side, and end portions of the adjacent straight pipe parts 1A to 1D are joined together by curved pipe parts 1E to 1G each extending in an arc shape, thereby forming a flow passage of a gas. The reference numeral 6 denotes a separator member that prevents narrowing between the adjacent straight pipe parts. The reference numeral 7 denotes a support member that is supported by an overhanging part 3A to prevent the downward displacement of the conduit 1.

The inlet side of the straight pipe part 1A at the most upstream position and the outlet side of the straight pipe part 1D at the most downstream position are fixed to a furnace wall 3 so that the conduit 1 is supported by the furnace wall 3.

Figure 2:
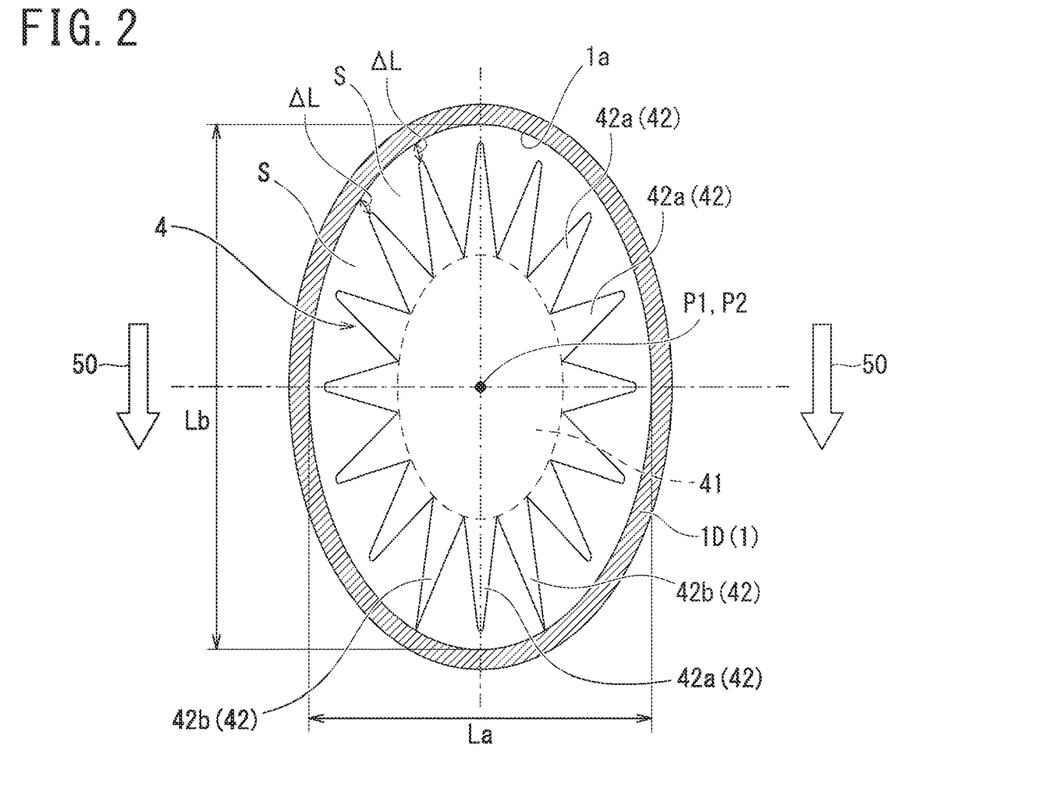
FIG. 2 is a cross-sectional view, taken along A-A' in FIG. 1, of a cross section of a conduit and a heat transfer promoter of the example.

When an object to be heated is conveyed along the arrangement direction of the plurality of straight pipe parts 1A to 1D, the object to be heated is indirectly heated by the radiant tube 100. FIG. 2 illustrates an example of the conveying direction of the object to be heated by the reference numeral 50. FIG. 1 exemplifies a configuration where the arrangement direction of the plurality of straight pipe parts 1A to 1D is the up-down direction, but the arrangement direction of the plurality of straight pipe parts 1A to 1D may be the left-right direction.

The conduit shape of the radiant tube 100 is not limited to the generally W-shape in side view. The conduit shape of the radiant tube 100 may be another shape such as, for example, a U-type shape or a straight-type shape.

A description will be made by giving an example in which, in the conduit 1 of this example, an opening cross section of at least the straight pipe part 1D where the heat transfer promoters 4 are disposed has, as illustrated in FIG. 2, an oval shape with the short diameter and the long diameter different from each other. It is preferable that the long diameter side be directed in the up-down direction as illustrated in FIG. 2. When the opening cross section of the straight pipe part 1D has the oval shape with the short diameter and the long diameter different from each other, it is preferable that the conduit 1 in its entirety have the oval shape with the short diameter and the long diameter different from each other. Nevertheless, our concepts are applicable even when the opening cross section of the conduit 1 has another cross-sectional shape such as a perfect circle or a rectangular shape.

Radiant Tube Burner 2

A gas generating part 2A of the radiant tube burner 2 is disposed on the inlet side of the conduit 1. The gas generating part 2A ejects a fuel gas and combustion air along the extending direction of the conduit 1 to generate a combustion gas. The generated combustion gas transfers the heat to the conduit 1 while flowing from the inlet side toward the outlet side in the conduit 1.

The gas generating part 2A is not particularly limited as long as it can generate a combustion gas that is made to pass through the inside of the conduit 1, and it is possible to use a known burner.

Heat Transfer Promoter 4

The heat transfer promoter 4 is disposed on the outlet side with respect to the intermediate position in the extending direction in the conduit 1 of the radiant tube 100. The heat transfer promoter 4 is provided in the conduit 1 for improving the heat transfer efficiency of the radiant tube 100.

Next, the heat transfer promoter 4 of this example will be described.

In this example, the plurality of heat transfer promoters 4 is coaxially disposed along the axis of the conduit 1. The plurality of heat transfer promoters 4 adjusts, as appropriate, the waste heat reduction ratio and the pressure loss of the radiant tube 100.

Each of the heat transfer promoters 4 includes a body part 41 located on the cross-section center side of the conduit 1 (the axial side of the conduit 1), and the plurality of protruding parts 42 integrated with the body part 41 and protruding from the body part 41 toward an inner wall surface 1a of the conduit 1.

The plurality of protruding parts 42 is arranged in the circumferential direction of the conduit 1 and integrally formed on the outer periphery of the body part 41. The heat transfer promoters 4 are disposed in the conduit 1 such that the protruding parts 42 of the heat transfer promoters 4 are aligned with each other in the longitudinal direction of the conduit 1. It is preferable that the adjacent heat transfer promoters 4 be disposed in contact with each other.

Each of the protruding parts 42 protrudes from the body part 41 toward the radially outer side of the conduit 1, and as viewed in the axial direction of the conduit 1, has a shape such that, as illustrated in FIG. 2, the width along the circumferential direction of the conduit 1 decreases as away from the body part 41 (as approaching the wall surface of the conduit 1). On the other hand, each of the protruding parts 42 is configured such that the shape is the same along the axial direction of the conduit 1. As a result, between every two protruding parts 42 adjacent to each other in the circumferential direction of the conduit 1, a space is formed in which the distance between the adjacent two protruding parts 42 increases as away from the body part 41. The contour that defines the cross-sectional shape of the protruding part 42 does not have to be rectilinear.

The plurality of protruding parts 42 of each heat transfer promoter 4 is classified into a plurality of first protruding parts 42a and a second protruding part 42b. A distal end portion of the first protruding part 42a is not in contact with the inner wall surface 1a of the conduit 1, and the distal end portion of the first protruding part 42a is disposed to face the inner wall surface 1a of the conduit 1 across a gap ΔL in the radial direction of the conduit 1.

On the other hand, in this example, the second protruding part 42b is in contact with the inner wall surface 1a of the conduit 1 at a distal end portion of the protruding part 42. In this example, positioning (positioning in the direction perpendicular to the axis of the conduit 1) of the heat transfer promoter 4 in the conduit 1 can be performed by the second protruding part 42b. In this example, the number of second protruding parts 42b is preferably two or more.

On the other hand, if it is possible to perform positioning (positioning in the direction perpendicular to the axis of the conduit 1) of the heat transfer promoter 4 in the conduit 1 by another means, there is no need to make the second protruding part 42b contact the inner wall surface 1a of the conduit 1.

It is preferable that the number of second protruding parts 42b be as small as possible. In this example, the number of second protruding parts 42b is smaller than the number of first protruding parts 42a. Preferably, the number of second protruding parts 42b is equal to or less than ⅓ of the number of first protruding parts 42a, and more preferably equal to or less than ¼ of the number of first protruding parts 42a. However, to perform positioning of the heat transfer promoter 4 in the conduit 1 by the second protruding part 42b, it is necessary that the number of second protruding parts 42b be two or more. FIG. 2 exemplifies when the number of second protruding parts 42b is two, wherein the heat transfer promoter 4 is supported by its own weight with respect to the conduit 1 by the two second protruding parts 42b located on the lower side.

In this example, the gap ΔL between the distal end portion of the first protruding part 42a and the inner wall surface 1a of the conduit 1 facing the distal end portion is defined as follows.

That is, when a ratio (ΔL/Dt) of the gap ΔL to an equivalent diameter Dt of the straight pipe part 1D of the conduit 1 where the heat transfer promoters 4 are disposed is given by x in percentage, the gap ΔL is set to satisfy formula (1):

$$0.3\% < x < 7\% \tag{1}$$

Further, it is more preferable to satisfy formula (2):

$$0.5\% < x < 4.5\% \tag{2}$$

An example of the heat transfer promoter 4 of this example will be described.

As described above, each of the heat transfer promoters 4 includes the body part 41 and the plurality of protruding parts 42 protruding from the outer periphery of the body part 41 toward the inner wall surface 1a.

As illustrated in FIG. 2, the body part 41 has a columnar shape with a cross section having a shape similar or approximate to the oval shape of the opening cross section of the conduit 1. The body part 41 is disposed such that the axis (longitudinal direction) of the columnar shape is disposed parallel to the axis of the conduit 1.

With the body part 41, the area through which a gas flowing in the conduit 1 passes is limited so that the flow velocity of the gas flowing on the outer peripheral side (the outer diameter side) of the body part 41 increases.

Further, by providing the plurality of protruding parts 42 on the outer periphery of the body part 41, the gas flowing on the outer periphery of the body part 41 is divided into a plurality of gases along the circumferential direction by the protruding parts 42 so that the gases respectively flow in the spaces between the adjacent protruding parts 42.

The protruding part 42 of this example has a cross section of a generally triangular shape (triangular shape as viewed in the axial direction of the conduit 1), and the base is integrally formed with the outer periphery of the body part 41. Further, in the longitudinal direction, the protruding part 42 has a thick plate shape with the same cross-sectional shape in the direction parallel to the axis of the conduit 1 (a rectangular shape in side view).

As illustrated in FIG. 2, between the protruding parts 42 adjacent to each other in the circumferential direction of the conduit 1 (as viewed in the axial direction of the conduit 1), a space S is formed that has a triangular cross section in which the width increases as away from the body part 41.

With the plurality of protruding parts 42, the gas flowing on the outer periphery of the body part 41 is unlikely to form a swirling flow and flows along the axis of the conduit 1 as a laminar flow along the spaces S. That is, by providing the plurality of protruding parts 42, gas flow passages individual to each other are formed between the protruding parts 42 in the circumferential direction so that it is possible to make the gas pass through the respective gas flow passages.

In FIG. 2, the second protruding parts 42b are configured by making the two protruding parts 42 on the lower side longer than the other protruding parts 42. By the contact of the distal ends of the two protruding parts 42b with the lower surface side of the inner wall of the conduit 1, the heat transfer promoter 4 is supported at a predetermined position in the conduit 1. When the uppermost protruding part 42 is also in contact with the inner wall of the conduit 1 as the second protruding part 42b, the heat transfer promoter 4 is positioned more stably in the conduit 1. However, the number of second protruding parts 42b is preferably as small as possible.

As illustrated in FIG. 2, it is preferable that the position of the center of gravity P2 of the heat transfer promoter 4 disposed in the conduit 1 be set (disposed) to coincide with the center P1 (the center of gravity) of the opening cross section of the conduit 1 by the plurality of second protruding parts 42b. When the centers of gravity P1, P2 of both members 1, 4 are disposed to coincide with each other, the center of gravity P2 of the heat transfer promoter 4 and a center-of-gravity portion in a cross section perpendicular to the combustion flow direction of the radiant tube 100 coincide with each other so that it is possible to suppress the offset of the heat transfer promoter 4 to the gravity direction to eliminate a reduction in heat transfer performance. When the radiant tube shape is oval, it is very effective to make the center of gravity of the heat transfer promoter 4 and the center-of-gravity portion in the cross section perpendicular to the combustion flow direction of the radiant tube 100 coincide with each other.

Further, in this example, the lengths of the first and second protruding parts and the size of the body part 41 are set so that the protruding parts 42 other than the protruding parts 42 forming the second protruding parts 42b form the first protruding parts 42a, and that the gap ΔL is formed between the distal end portion of each of the plurality of first protruding parts 42a and the inner surface of the conduit 1.

It is assumed that the gap ΔL satisfies the condition of formula (1).

Action

Next, the action of the heat transfer promoter 4 of this example will be described.

With the body part 41, the area through which the gas flowing in the conduit 1 passes is limited so that the flow velocity of the gas flowing on the outer peripheral side (the outer diameter side) of the body part 41 increases. In this example, by making the center of gravity of the cross section of the body part 41 and the center of gravity of the cross section of the conduit 1 coincide with each other or approximate to each other, the distribution of the gas flowing on the outer periphery of the body part 41 is further equalized.

Further, with the plurality of protruding parts 42, the space on the outer periphery of the body part 41 is divided into a plurality of spaces along the circumferential direction of the conduit 1. That is, gas flow passages independent of each other are formed between the adjacent protruding parts 42 so that it is possible to make the gas pass through the respective gas flow passages.

When the ratio of the cross-sectional area of the heat transfer promoter 4 to the opening cross-sectional area of the conduit 1 portion where the heat transfer promoter 4 is disposed is given by A, and the ratio of the perimeter of the cross section of the heat transfer promoter 4 to the perimeter of the opening cross section of the conduit 1 portion where the heat transfer promoter 4 is disposed is given by B, it is preferable that the heat transfer promoter 4 with respect to the conduit 1 satisfy formula (3) and formula (4):

$$A \leq 0.53 \tag{3}$$

$$(1-A)^{-4/5} \times A \cdot B \geq 2.48 \tag{4}$$

Formula (3) and formula (4) will be described.

The area of the opening cross section of the installation part of the conduit 1 is given by α. Further, the cross-sectional area of the heat transfer promoter 4 is given by β. Then, A is given by (β/α). Further, the perimeter of the opening cross section of the installation part of the conduit 1 (the inner perimeter of the conduit 1) is given by c. Further, the perimeter of the heat transfer promoter 4 is given by d. Then, B is given by (d/c).

The heat transfer promoter 4 of this example is preferably designed so that A and B satisfy formula (3) and formula (4). We found that when A described above exceeds 0.53, the pressure loss is large to significantly suppress the flow of a combustion gas. Therefore, A is preferably 0.53 or less as defined by formula (3). More preferably, A is 0.46 or less.

We discovered formula (4) by paying attention to the fact that, based on the general convective heat transfer theoretical formula, as the cross-sectional area of the heat transfer promoter 4 decreases, the gas flow velocity decreases so that the effect of convective heat transfer is weakened, and the heat transfer area is proportional to the outer perimeter of the heat transfer promoter 4. We confirmed that when the left side of formula (4) is 2.48 or more, the desired heat transfer efficiency can be obtained.

Further, in this example, one of the features is to provide the predetermined gap ΔL between the first protruding part 42a and the inner wall surface 1a of the conduit 1.

Figure 3:
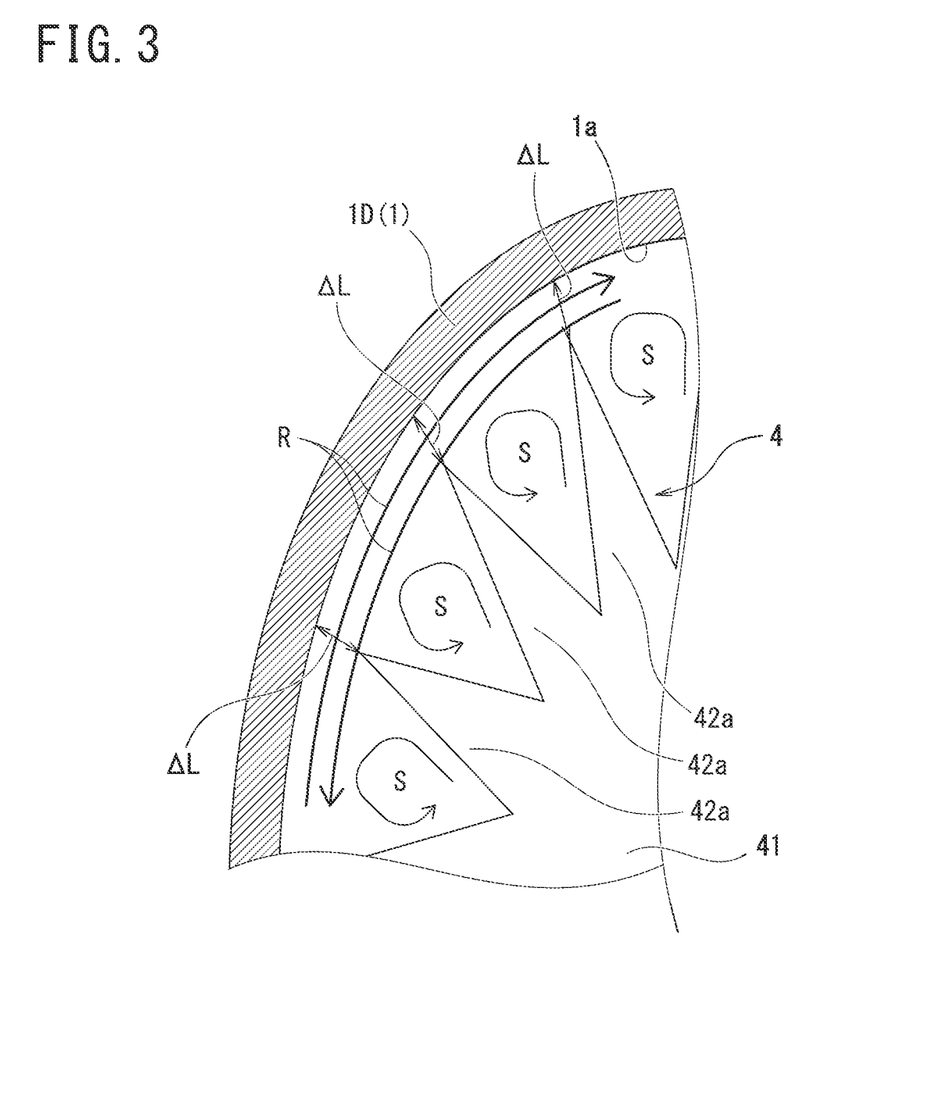
FIG. 3 is a schematic diagram as viewed in the axial direction of the conduit showing a swirling flow R formed in the vicinity of the inner wall surface.

As illustrated in FIG. 3, by providing the gap ΔL in the vicinity of the inner wall surface 1a of the conduit 1, the flow (swirling flow R) in the swirling direction of the combustion flow along the circumferential direction of the conduit 1 is formed in the vicinity of the inner wall surface of the conduit 1.

Assuming that the flow velocity in the flow direction of the combustion flow is given by Vx, and the flow velocities in a cross section perpendicular to the flow direction are given by Vy, Vz, the velocity V of the combustion flow can be expressed by formula (5):

$$V = \sqrt{(Vx^2 + Vy^2 + Vz^2)} \tag{5}$$

As seen from formula (5), the velocity V is increased corresponding to the swirling flow R formed in the vicinity of the inner wall of the conduit 1, and further, in this example, the heat transfer efficiency is also improved.

The swirling flow R becomes stronger particularly when the flow transitions from a curved surface to a straight surface. The portion where the flow transitions from the curved surface to the straight surface is, for example, a transition part from the curved pipe part 1G to the straight pipe part 1D in FIG. 1, and stagnation tends to occur in an upper-side space position around the A-A' cross section position in FIG. 1. This is due to the flow offset generated by the separation of the combustion flow on the curved surface. Therefore, with a heat transfer promoter that provides no gap or a gap less than the gap ΔL, different amounts of a combustion gas flow in the divided spaces S, respectively, and as a result, the heat transfer efficiency is reduced. On the other hand, by providing the proper gap ΔL, the flow rate balance between the plurality of spaces S defined by the protruding parts 42 is spontaneously kept at the same flow rate therebetween. In this example, the protruding parts 42 that divide the flow of the gas each have a shape in which the width decreases as approaching the inner wall surface 1a of the conduit 1. Therefore, as illustrated in FIG. 3, the swirling flow tends to occur also in each of the spaces S defined by the protruding parts 42 so that the heat transfer efficiency from the combustion flow to the heat transfer promoter is increased.

Further, in this example, the cross section of each of the spaces S defined by the protruding parts 42 is such that the width increases as approaching the inner wall surface 1a of the conduit 1, and thus the influence of the wall surface is small, resulting in a relatively small flow passage resistance. Therefore, the gas flowing between the protruding parts 42 flows more on the outer peripheral side than on the center side. As a result, more gas contributes to the swirling flow R formed in the vicinity of the inner wall surface 1a of the conduit 1.

In particular, in this example, the shape of the protruding part 42 is not a rectangular shape or the like in cross section, but a generally triangular shape in which the width in the circumferential direction is narrowed as approaching the inner wall of the conduit 1. Therefore, further, compared when the shape of the protruding part 42 is rectangular in cross section, the cross section of each of the spaces S defined by the protruding parts 42 is such that the degree of widening in the circumferential direction per unit length can be set to be greater as going radially outward. As a result, the gas flowing between the protruding parts 42 flows further more on the outer peripheral side than on the center side so that more gas contributes to the swirling flow R formed in the vicinity of the inner wall surface 1a of the conduit 1.

The protruding parts 42 preferably have a shape (a continuous shape) in which roots (portions on the body part side) of the adjacent protruding parts 42 are connected together.

Further, when the cross section of the space S formed between the protruding parts 42 has a triangular shape, the heat transfer promoter 4, the combustion gas, and the wall surface of the conduit 1 are always aligned with each other so that the radiant heat transfer from the combustion gas as a heat source to the conduit is not impaired.

For the swirling flow R to be generated in the vicinity of the inner wall surface 1a of the conduit 1, a predetermined gap ΔL is required between the protruding part 42 of the heat transfer promoter 4 and the inner wall surface 1a of the conduit 1. The predetermined gap ΔL is a gap equal to or greater than the width of a region, called a viscous sublayer, where the flow velocity of a combustion gas in the vicinity of a wall surface is approximate to zero.

In the flow in a conduit of a general industrial radiant tube, the region width of a viscous sublayer is more than 0.3% relative to the equivalent diameter, and therefore, when the gap is 0.5% relative to the equivalent diameter, it is fully in a transition region.

Therefore, in this example, the percentage x of a ratio (ΔL/Dt) of the gap ΔL to an equivalent diameter Dt of a conduit 1 portion where the heat transfer promoter 4 is disposed is set to more than 0.3% and preferably more than 0.5%.

On the other hand, when the gap ΔL is too large, the heat transfer area, particularly the area of convective heat transfer from the combustion flow to the heat transfer promoter becomes small. Therefore, the above-described x is set to less than 7% and preferably less than 4.5%.

As a material forming the heat transfer promoter 4, a material known as the heat transfer promoter 4 may be employed. For example, as such a material, insulating firebrick, refractory metal, ceramic, castable or the like can be cited by way of example. In terms of reducing the manufacturing cost and suppressing the deformation of the radiant tube 100 due to the weight of the heat transfer promoter 4, it is preferable to use an inexpensive and lightweight insulating firebrick.

As described above, in this example, the heat transfer promoter 4 is designed into the specific shape as described above. Consequently, it is possible to reduce the flow passage cross-sectional area and to increase the flow velocity of a combustion gas by the flow passage reduction. Further, in this example, it is possible to enhance the heat transfer efficiency while increasing the heat transfer area of the heat transfer promoter 4 without suppressing the swirling flow R of the combustion gas in the vicinity of the inner wall surface. The heat transfer promoter 4 of this example has the simple shape and thus can be manufactured inexpensively. By inserting the heat transfer promoter 4 into the radiant tube 100, it is possible to stir the combustion gas like the conventional technology. In the description given above, the heat transfer promoter 4 having the uniform cross section along the flow passage is used, but by tapering the heat transfer promoter 4 along the flow passage toward the exhaust gas upstream side, it is possible to further promote the stirring of the combustion gas and to further enhance the heat transfer efficiency.

About Equivalent Diameter

The equivalent diameter Dt can be calculated by the formula below from a perimeter L of the inner wall and an opening cross-sectional area Sa of the conduit 1 perpendicular to the flow direction:

$$Dt=(4 \cdot Sa)/L.$$

About Approximate Calculation of Viscous Sublayer in Circular Pipe Flow

A pipe friction coefficient f is expressed by the formula below from the Colebrook equation:

$$1/\sqrt{f}=-2 \log_{10}(((\varepsilon/Dt)/3.7)+(2.51/(Re\sqrt{f})))$$

where

ε: surface roughness

Re: Reynolds number (calculated by $(u \cdot Dt)/v$).

Assuming that a pressure drop per unit length in a circular pipe cross section is given by ΔP, it can be expressed by $$\Delta P = 1/2(f \cdot (1/Dt) \cdot \rho \cdot u^2).$$

Since a shear stress to generated in the inner wall surface $1a$ of the conduit $1$ per unit length and the pressure drop $\Delta P$ are equal to each other, the following can be obtained:

$$Sa \cdot \Delta P = L \cdot \tau_0$$

$$\tau_0 = (Sa/(2 \cdot l \cdot Dt)) f \cdot \rho \cdot u^2$$

A friction velocity $u^*$ can be expressed by $u^* = \sqrt{(\tau_0/\rho)}$.
The range of a viscous sublayer is given by $u^*(y/\nu) < 5$.
Therefore, since the gap $\Delta L$ of this example is satisfactory if it is greater than the viscous sublayer, it can be set as follows:

$$x[\%]/100 = \Delta L/Dt > 5(\nu/(u^* \cdot Dt)) \approx 0.003 \text{ or } (0.005).$$

Modifications (1) The cross-sectional shape of the distal end of the protruding part $42$ is preferably a chamfered shape or a curved surface shape such as a round shape.

The position, close to the inner wall surface $1a$ of the conduit $1$, in the heat transfer promoter $4$ is the distal end of the protruding part. By forming the distal end into the chamfered shape or the like to dull the contour shape, the area of a facing portion, facing the inner wall surface $1a$ of the conduit $1$, in the protruding part is gained.

Consequently, the efficiency of the transfer of the heat, transferred from a combustion gas to the heat transfer promoter $4$, to the inner wall surface $1a$ of the conduit $1$ from the distal end of the protruding part $42$ close to the inner wall surface $1a$ of the conduit $1$, is improved. That is, the heat transfer area of the heat transfer promoter $4$ to the conduit $1$ is increased so that a further heat transfer promotion effect is exhibited.

Figure 4A:
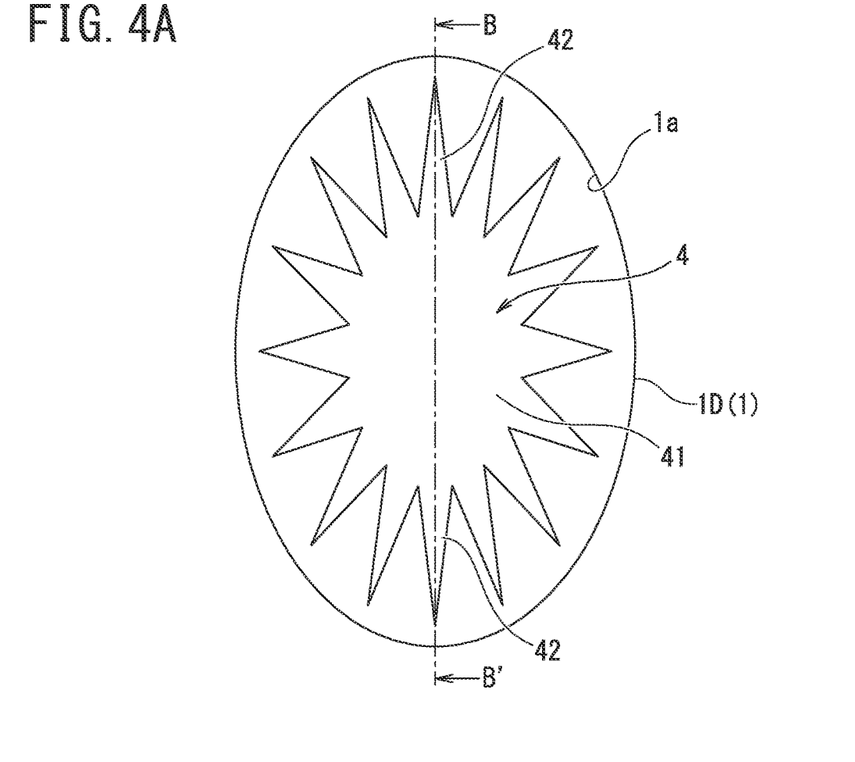
FIG. 4A is a plan view as viewed in the flow direction of a gas.
Figure 4B:
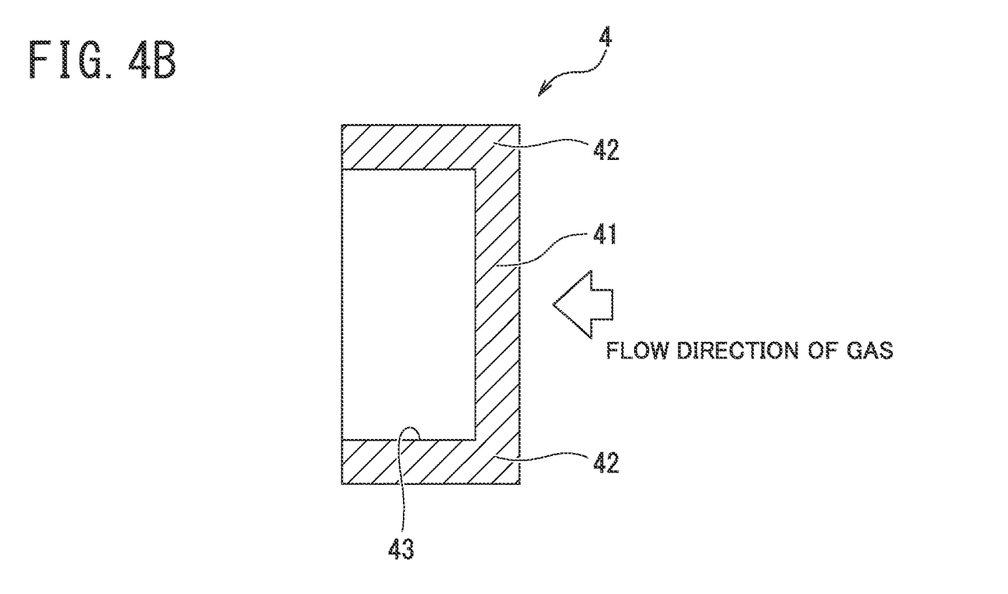
FIG. 4B is a B-B' cross-sectional view of FIG. 4A.

(2) For example, as illustrated in FIG. 4B, the heat transfer promoter $4$ has a cavity inside, and the cavity is open on the surface side along the direction of movement of a fluid flowing in the conduit $1$.

With this configuration, it is possible to reduce the weight of the heat transfer promoter $4$ while maintaining the heat transfer area of the heat transfer promoter $4$ to be large.

(3) As described above, the opening cross section of the conduit $1$ portion where the heat transfer promoter $4$ is disposed has the oval shape with the lengths of the short diameter and the long diameter different from each other, and the long diameter may be disposed in the up-down direction.

An atmosphere in which the radiant tube $100$ is disposed becomes a high temperature atmosphere so that the heat load is applied to the conduit $1$, but in this modification, the rigidity of the conduit $1$ is improved so that even when the load of the heat transfer promoter $4$ and the heat load are applied to the conduit $1$, it is possible to suppress the deformation of the conduit $1$. This makes it possible that indirect heating from the radiant tube $100$ to an object to be heated is stably performed for a longer time.

(4) The number of first protruding parts $42a$ is preferably 8 or more and 25 or less, for example. As the number of protruding parts $42$ increases, the number of flow passages formed on the outer periphery of the body part $41$ increases so that the adjustment of the flow in the axial direction of the conduit $1$ along the circumferential direction becomes easy.

However, when it is too many, there is a possibility that the flow passage resistance becomes high, and therefore, 25 or less is preferable.

(5) It is preferable that one or more first protruding parts $42a$ be disposed between the adjacent two second protruding parts $42b$.

It is possible to suppress a reduction in location of occurrence of a swirling flow R along the circumferential direction.

Figure 5:
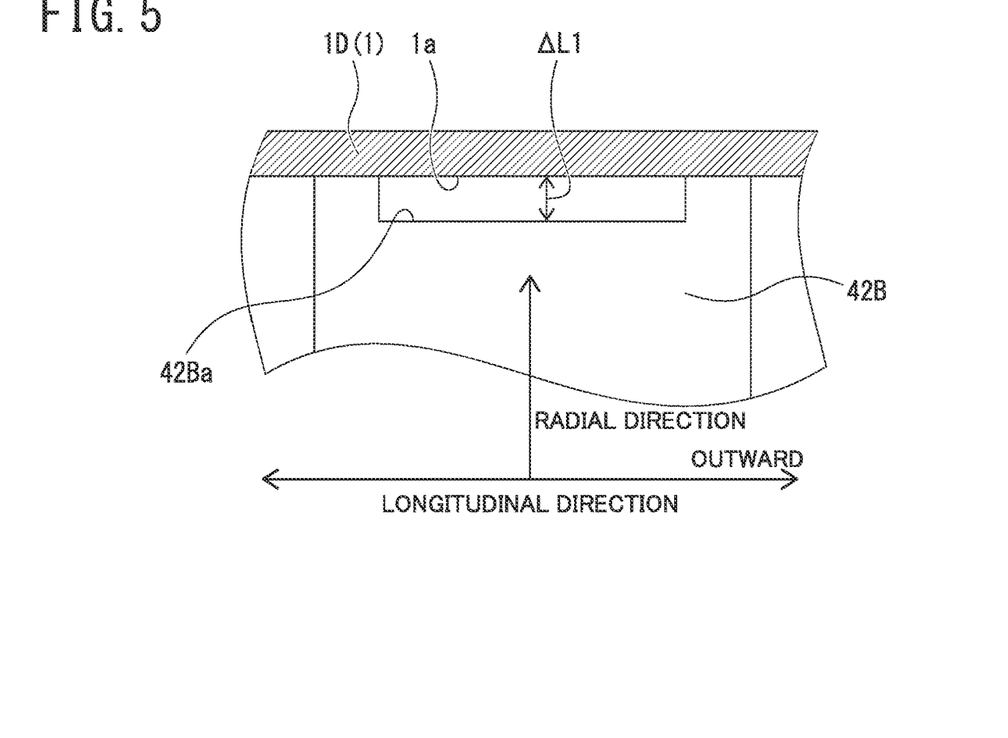
FIG. 5 is an enlarged view showing an example in which a second protruding part is provided with a cutout.

A cutout $42Ba$ as illustrated in FIG. 5 may be formed in the distal end of the second protruding part $42b$ contacting the surface of the conduit $1$, at an intermediate position in the longitudinal direction, thereby reducing the suppression of the flow of a swirling flow R due to the second protruding part $42b$. A facing distance $\Delta L1$ to the inner wall surface $1a$ of the conduit $1$ in the cutout $42Ba$ is set to a value in the same range as the facing condition of the gap $\Delta L$ with respect to the inner wall surface $1a$. That is, it is preferable to perform the setting to satisfy a formula equivalent to formula (1).

(6) An object to be heated is conveyed along the arrangement direction of the plurality of conduits $1A$ to $1D$ and indirectly heated by the radiant tube $100$. When the cross section of the conduit $1$ has an oval shape, the heating efficiency is better when the long diameter is set in the arrangement direction of the conduit $1$.

It is preferable that the area of a space between the protruding parts $42$ disposed on the side facing the object to be heated be set to be relatively greater than the area of a space between the protruding parts $42$ at another position. For example, the inside of the conduit $1$ is divided into four regions by two straight lines obtained by inclining the minor axis of the oval shape by ±45 degrees about the center of the oval shape, and with respect to the areas of spaces between the protruding parts $42$ located in the divided regions, the total area of the spaces in the divided region disposed on the side more facing the object to be heated (in the oval shape, the divided region including the minor axis) is set to be relatively greater than the total area of the spaces in the other divided region.

Advantageous Effects

This example exhibits the following effects.

(1) In this example, the radiant tube $100$ includes: the conduit $1$ configured to be heated by a fluid gas flowing in the conduit $1$; and one or two or more heat transfer promoters $4$ disposed in the conduit $1$ along the axis of the conduit $1$, wherein: the heat transfer promoter $4$ includes the body part $41$ disposed on the center side of the conduit $1$, and the plurality of protruding parts $42$ protruding from the body part $41$ toward the inner wall surface $1a$ of the conduit $1$; the plurality of protruding parts $42$ is formed on the outer periphery of the body part $41$ to be arranged in the circumferential direction of the conduit $1$; the plurality of protruding parts $42$ includes the plurality of first protruding parts $42a$ each having the distal end portion facing the inner wall surface $1a$ of the conduit $1$ across the gap $\Delta L$, and the second protruding parts $42b$ as the remainder; the number of first protruding parts $42a$ is set to be greater than the number of second protruding parts $42b$; and when the ratio $(\Delta L/Dt)$ of the gap $\Delta L$ to the equivalent diameter $Dt$ of the conduit $1$ portion, where the heat transfer promoter $4$ is disposed, of the conduit $1$ is given by $x[\%]$ in percentage, the formula below is satisfied:

$$0.3\% < x < 7\%.$$

With this configuration, it is possible to provide the radiant tube 100 including the heat transfer promoter 4 that can be manufactured inexpensively while improving the heat transfer efficiency.

In particular, with this configuration, despite the simple structure of the heat transfer promoter 4, the swirling flow R that contributes to the heat transfer can be easily formed in the vicinity of the inner wall surface 1*a* of the conduit 1 so that the heat transfer efficiency is improved.

(2) In this example, the distal ends of the second protruding parts 42*b* are in contact with the inner wall surface 1*a* of the conduit 1, thereby performing the positioning of the heat transfer promoter 4 with respect to the conduit 1. In this example, the number of second protruding parts 42*b* is two or more.

With this configuration, it is possible to easily dispose the heat transfer promoter 4 in the conduit 1 while forming the gap ΔL between the first protruding part 42*a* and the inner wall surface 1*a*.

The distal end of the second protruding part 42*b* does not have to be in contact with the inner wall surface 1*a* of the conduit 1. In this example, it is not necessary that a gap between the distal end of the second protruding part 42*b* and the inner wall surface 1*a* of the conduit 1 satisfy the gap ΔL.

(3) In this example, the heat transfer promoter 4 is disposed such that the center of gravity P2 of the heat transfer promoter 4 coincides with the center P1 (the center of gravity) of the opening cross section of the conduit 1.

When the centers of gravity of both members are disposed to coincide with each other, the center of gravity of the heat transfer promoter 4 and the center-of-gravity portion in a cross section perpendicular to the combustion flow direction of the radiant tube 100 coincide with each other so that it is possible to suppress the offset of the heat transfer promoter 4 to the gravity direction to eliminate a reduction in heat transfer performance.

(4) In this example, the cross-sectional shape of each of the protruding parts 42 is a shape such that the width along the circumferential direction of the conduit 1 decreases as away from the body part 41 in the radial direction of the conduit 1, and, between the two protruding parts 42 adjacent to each other in the circumferential direction of the conduit 1, a space is formed in which the distance between the adjacent two protruding parts 42 increases as away from the body part 41.

With this configuration, the space in which the distance between the adjacent two protruding parts 42 increases as away from the body part 41 is formed between the two protruding parts 42, and therefore, compared to when the protruding part 42 has a plate shape in cross section, the gas flow flows more on the outer peripheral side so that the swirling flow R due to the gap ΔL at the distal end of the protruding part 42 is more reliably formed, and as a result, it is possible to further improve the heat transfer efficiency.

(5) In this example, the shape of the distal end portion of the protruding part 42 is a chamfered shape or a curved surface shape.

With this configuration, the heat transfer efficiency from the protruding part 42 to the conduit 1 is further improved.

(6) The heat transfer promoter 4 has a cavity inside, and the cavity may have a shape in which the surface facing the direction of movement of a fluid flowing in the conduit 1 is closed.

With this configuration, the weight reduction of the heat transfer promoter 4 is achieved and it is possible to further suppress the deformation of the conduit 1 due to the heat load.

(7) In this example, the opening cross section of the conduit 1 portion where the heat transfer promoter 4 is disposed is oval. In the oval, the short diameter being the shortest diameter and the long diameter being the diameter perpendicular to the short diameter differ from each other in length. It is preferable that the long diameter of the oval be directed in the up-down direction.

With this configuration, the rigidity of the conduit 1 is improved so that the deformation of the conduit 1 due to the heat load can be further suppressed, and further, it is possible to further improve the heat transfer efficiency by the heat transfer promoter 4 of this example.

In the oval, (long diameter Lb/short diameter La) is set to 1.1 or more and 1.6 or less, for example.

(8) It is preferable that the cross-sectional shape of each of the heat transfer promoters 4 in the longitudinal direction be the same, that the shapes of the plurality of heat transfer promoters 4 be the same, and that the plurality of heat transfer promoters 4 be coaxially disposed with the positions of the distal end portions aligned in the axial direction.

In this example, the swirling flow R can be more reliably generated only in the vicinity of the inner wall surface 1*a* of the conduit 1, and even with the heat transfer promoters 4 of the simple structure, it is possible to further improve the heat transfer efficiency.

EXAMPLES

Hereinafter, an Example will be described.

In this Example, the heat transfer promoter 4 used in the radiant tube 100 was evaluated by a combustion heat transfer simulation using a finite volume method below.

(i) Conduit 1

The shape of the conduit 1 in the extending direction was the W-shape illustrated in FIG. 1, and the opening cross section of the conduit 1 had an oval shape with a long diameter of 236 mm and a short diameter of 188 mm. The entire length of the conduit 1 was set to 8900 mm.

(ii) Gas Generating Part 2A

A burner was used as the gas generating part 2A. As a fuel, a gas generated during carbonization of coal in a coke oven was refined and used.

(iii) Heat Transfer Promoter 4

Ten heat transfer promoters 4 were disposed in the straight pipe part, located at the most downstream position, from the position of 300 mm to the position of 950 mm on the outlet side of the radiant tube 100.

(iv) Waste Heat Reduction Ratio

As the waste heat reduction ratio, the balance between the heat radiation amount from a test furnace and the heat quantity of an exhaust gas was calculated to calculate the ratio of the heat quantity of the exhaust gas accounting for the heat input. Then, the ratios were shown assuming that the waste heat reduction ratio when all protruding parts 42 of a heat transfer promoter 4 of a later-described example 1 were in contact with the inner wall of the radiant tube 100 (see FIG. 6) was given by 1.00.

In this Example, when the waste heat reduction ratio was 1.20 or more and preferably when the waste heat reduction ratio was 1.50 or more, the heat transfer efficiency was determined to be excellent to make a determination of pass.

First, a study was made about the basic shape of a heat transfer promoter 4 having a star shape in cross section.

Figure 6:
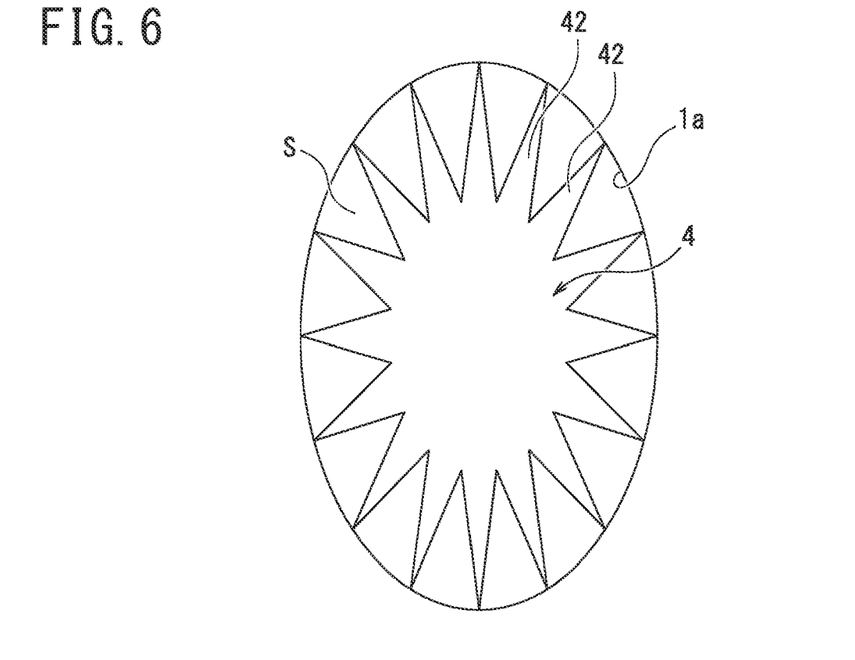
FIG. 6 is a diagram showing a heat transfer promoter of an Example 1 (conventional example).

In Example 1 illustrated in FIG. 6, all distal ends of distal end portions of the heat transfer promoter 4 and the inner wall of the conduit 1 were in contact with each other.

Figure 7:
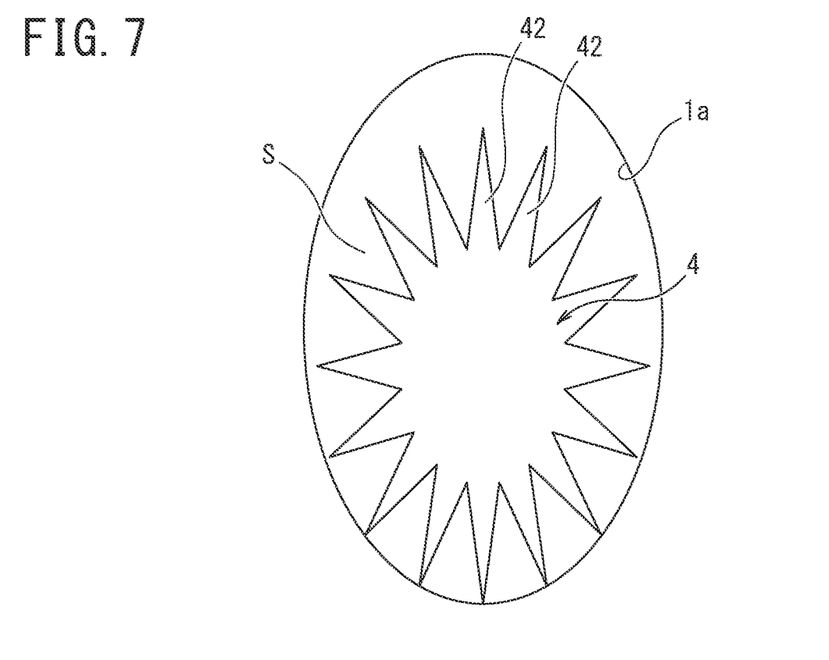
FIG. 7 is a diagram showing a heat transfer promoter of an Example 2.

In Example 2 illustrated in FIG. 7, distal end portions of a heat transfer promoter 4 were equally shortened.

However, the heat transfer promoter 4 was offset to the gravity direction. That is, this is when the position of the center of gravity of the heat transfer promoter 4 is located below the cross-section center of the conduit 1.

Figure 8:
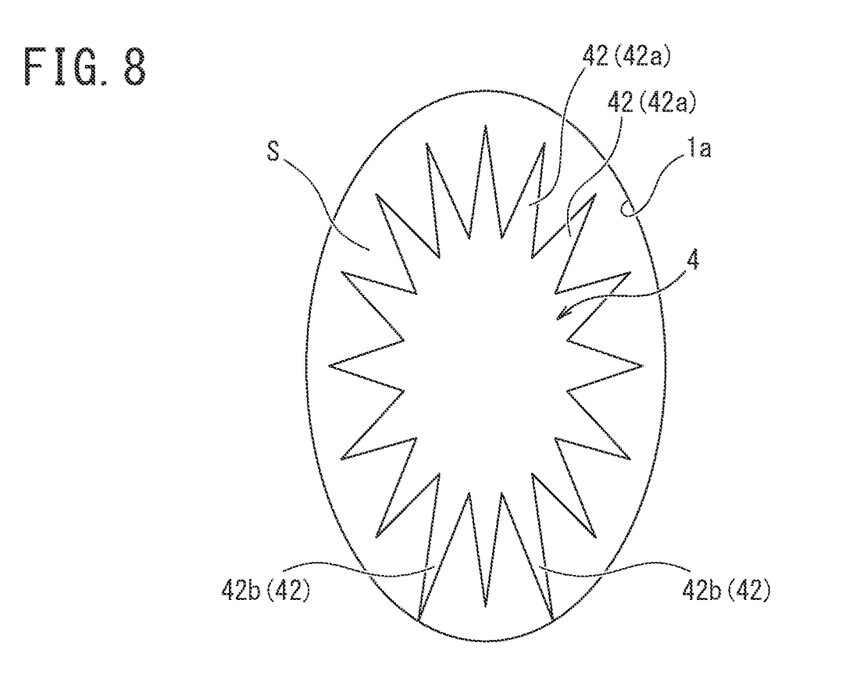
FIG. 8 is a diagram showing a heat transfer promoter of an Example 3.

In Example 3 illustrated in FIG. 8, only the two distal end portions in Example 2 were made to have the same length as those in Example 1 to obtain second protruding parts 42b, thereby making the center of gravity of a heat transfer promoter 4 and the center (the center-of-gravity portion of a cross section in the direction perpendicular to the flow direction on a cylinder) of the conduit 1 coincide with each other.

Figure 9:
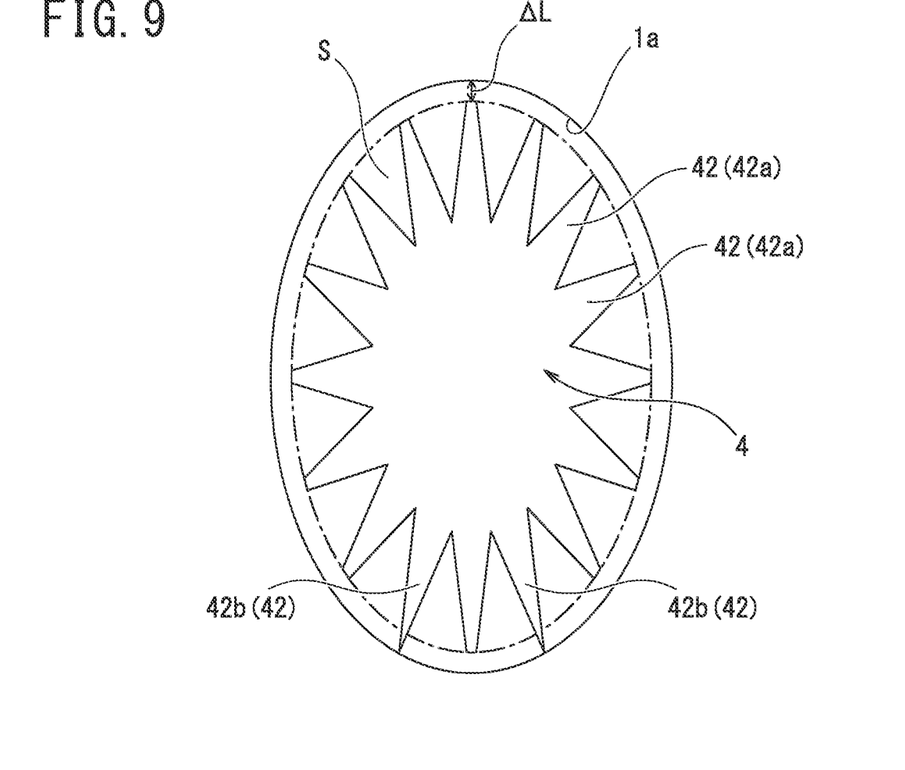
FIG. 9 is a diagram showing a heat transfer promoter of an Example 4.

In Example 4 illustrated in FIG. 9, distal ends of protruding parts 42 were chamfered in the shape of Example 1 so that a gap ΔL at the distal ends of the protruding parts 42 was made the same as that in Example 3. When the protruding parts 42 were rounded in the shape of the protruding parts 42 illustrated in FIG. 9, the waste heat reduction amount was approximately equal to Example 4.

Figure 10:
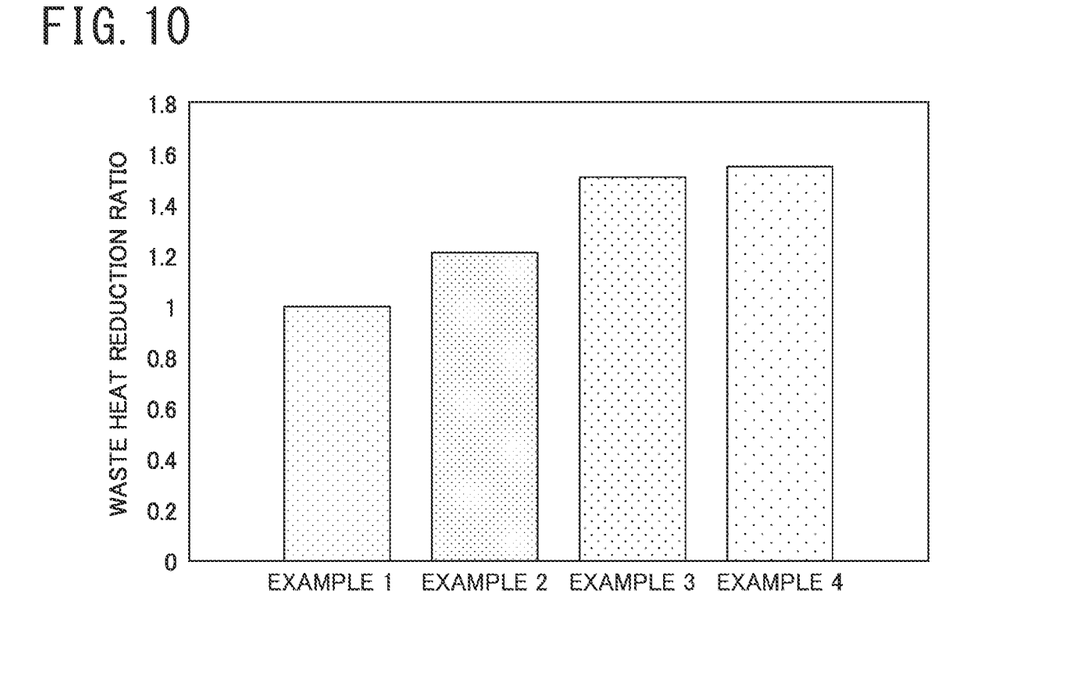
FIG. 10 is a diagram illustrating the results of verifying our desired effect.

The study results of Examples 1 to 4 described above are illustrated in FIG. 10. In FIG. 10, the vertical axis represents the waste heat reduction ratio.

As seen from FIG. 10, by providing the gap ΔL at the distal ends of the protruding parts 42 as in Examples 2 to 4, the waste heat reduction ratio is improved compared to the state where the distal end portions are in contact with the conduit 1 (Example 1).

Further, by making the center of gravity of the cross section of the conduit 1 and the center of gravity of the cross section of the heat transfer promoter 4 coincide with each other or approximate to each other as in Examples 3 and 4, the waste heat reduction ratio was further improved so that the waste heat reduction ratio was 1.50 or more.

Next, based on the shape of Example 4, the waste heat reduction ratio was studied by changing the gap ΔL between the distal end portion of the star-shaped heat transfer promoter 4 and the inner wall of the conduit 1.

Figure 11:
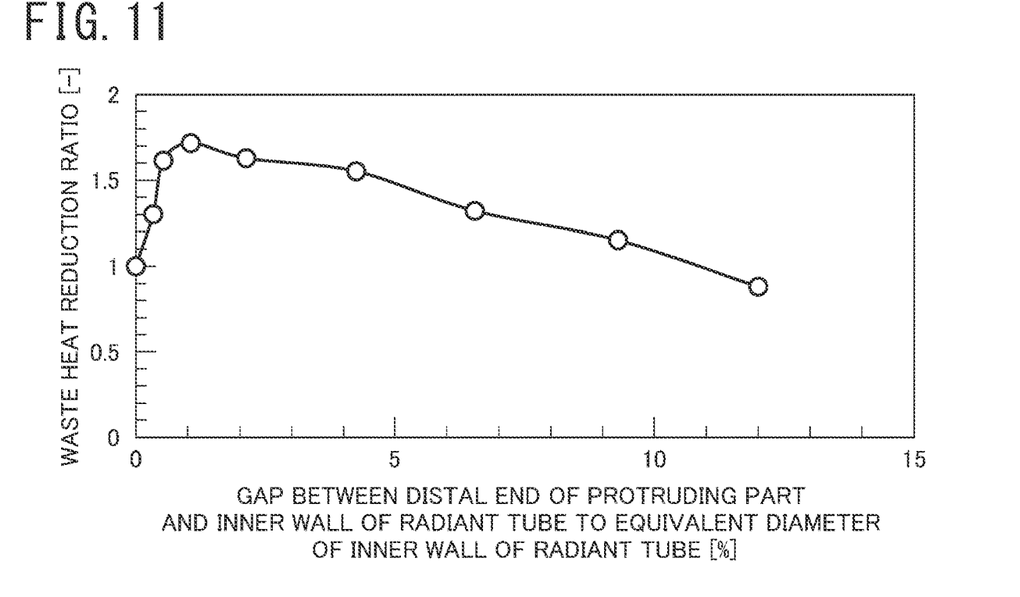
FIG. 11 is a diagram illustrating the results of verifying the desired effect of a gap ΔL.

The results are illustrated in FIG. 11.

As seen from FIG. 11, we confirmed that when the gap ΔL between the distal end of the protruding part 42 and the inner wall of the radiant tube 100 to the equivalent diameter of the tube inner wall satisfies 0.3<x<7, the waste heat reduction ratio becomes 1.3 times or more so that a very high heat transfer efficiency improving effect is exhibited. We confirmed that, more preferably, when the gap ΔL between the distal end portion and the inner wall satisfies 0.5<x<4.5, the waste heat reduction ratio becomes 1.5 times or more so that a further higher heat transfer efficiency improving effect is exhibited.

Next, a comparison was made between the conduit 1 having a perfect circular shape with a diameter of 188 mm and the conduit 1 having the oval shape.

In either configuration, the condition was such that the waste heat amount when the distal end portions of the heat transfer promoter 4 were in contact with the wall surface of the conduit 1 was used as a reference, and that the gap ΔL between the distal end of the protruding part 42 and the inner wall of the radiant tube 100 to the equivalent diameter of the tube inner wall was the same between the perfect circle and the oval.

Figure 12:
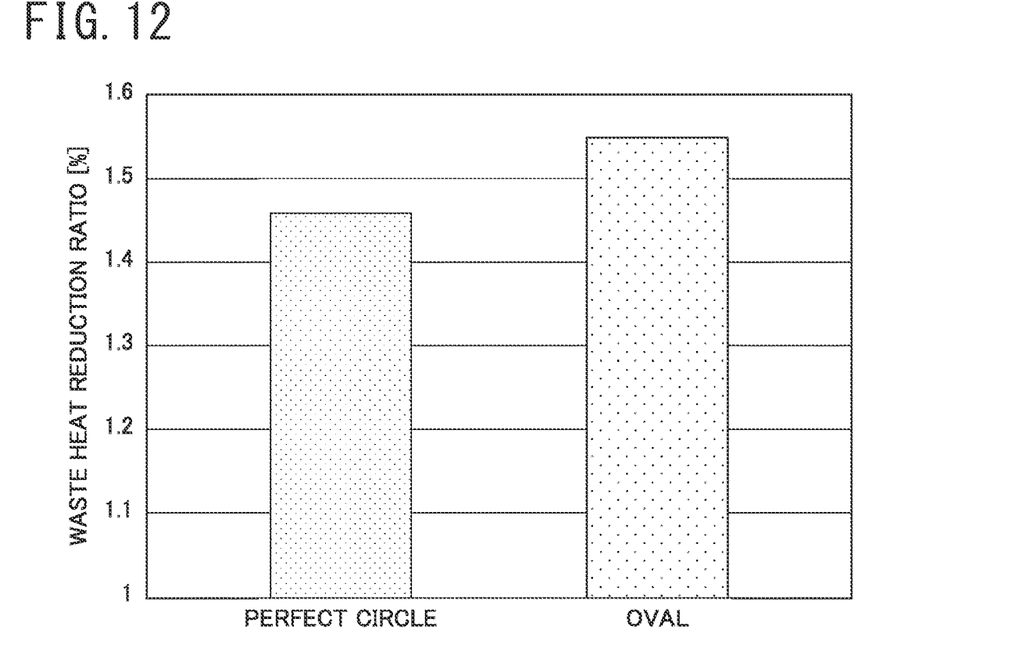
FIG. 12 is a diagram illustrating the results of verifying the desired effect due to the difference in cross section of conduits.

The comparison results are illustrated in FIG. 12.

As seen from FIG. 12, the waste heat reduction ratio is improved similarly regardless of the opening cross section of the conduit 1 being either circular or oval. Further, the waste heat reduction ratio is improved by about 10% when the opening cross section of the conduit 1 is oval compared to when it is circular.

The entire contents of Japanese Patent Application No. 2020-028033 (filed on Feb. 21, 2020) to which this application claims priority form part of this disclosure by reference. While the description has been made with reference to the limited number of examples herein, the scope of the right is not limited to them, and modifications of the examples based on the disclosure described above are apparent to those skilled in the art.

The invention claimed is:

1. A radiant tube comprising: a conduit configured to be heated by a fluid gas flowing in the conduit; and one or two or more heat transfer promoters disposed in the conduit along an axis of the conduit, wherein:
    the heat transfer promoter includes a body part disposed on a center side of the conduit, and a plurality of protruding parts protruding from the body part toward an inner wall surface of the conduit,
    the plurality of protruding parts is formed on an outer periphery of the body part to be arranged in a circumferential direction of the conduit,
    the plurality of protruding parts includes a plurality of first protruding parts each having a distal end portion facing the inner wall surface of the conduit across a gap ΔL, and a second protruding part as a remainder,
    the number of first protruding parts is set to be greater than the number of second protruding parts, and
    when a ratio (ΔL/Dt) of the gap ΔL to an equivalent diameter Dt of a conduit portion, where the heat transfer promoter is disposed, of the conduit is given by x[%] in percentage, formula (1) is satisfied:

$$0.3\% < x < 7\% \tag{1}$$

2. The radiant tube according to claim 1, wherein a distal end of the second protruding part is in contact with the inner wall surface of the conduit.

3. The radiant tube according to claim 1, wherein the heat transfer promoter is disposed such that a center of gravity of the heat transfer promoter coincides with a center of an opening cross section of the conduit.

4. The radiant tube according to claim 2, wherein the heat transfer promoter is disposed such that a center of gravity of the heat transfer promoter coincides with a center of an opening cross section of the conduit.

5. The radiant tube according to claim 1, wherein a cross-sectional shape of each of the protruding parts is a shape such that a width along the circumferential direction of the conduit decreases as away from the body part in a radial direction of the conduit, and
    between the two protruding parts adjacent to each other in the circumferential direction of the conduit, a space is formed in which a distance between the adjacent two protruding parts increases as away from the body part.

6. The radiant tube according to claim 2, wherein a cross-sectional shape of each of the protruding parts is a shape such that a width along the circumferential direction of the conduit decreases as away from the body part in a radial direction of the conduit, and between the two protruding parts adjacent to each other in the circumferential direction of the conduit, a space is formed in which a distance between the adjacent two protruding parts increases as away from the body part.

7. The radiant tube according to claim 3, wherein a cross-sectional shape of each of the protruding parts is a shape such that a width along the circumferential direction of the conduit decreases as away from the body part in a radial direction of the conduit, and between the two protruding parts adjacent to each other in the circumferential direction of the conduit, a space is formed in which a distance between the adjacent two protruding parts increases as away from the body part.

8. The radiant tube according to claim 1, wherein a shape of the distal end portion of the protruding part is a chamfered shape or a curved surface shape.

9. The radiant tube according to claim 2, wherein a shape of the distal end portion of the protruding part is a chamfered shape or a curved surface shape.

10. The radiant tube according to claim 3, wherein a shape of the distal end portion of the protruding part is a chamfered shape or a curved surface shape.

11. The radiant tube according to claim 4, wherein a shape of the distal end portion of the protruding part is a chamfered shape or a curved surface shape.

12. The radiant tube according to claim 1, wherein the heat transfer promoter has a cavity inside, and the cavity has a shape in which a surface facing a direction of movement of a fluid flowing in the conduit is closed.

13. The radiant tube according to claim 2, wherein the heat transfer promoter has a cavity inside, and the cavity has a shape in which a surface facing a direction of movement of a fluid flowing in the conduit is closed.

14. The radiant tube according to claim 3, wherein the heat transfer promoter has a cavity inside, and the cavity has a shape in which a surface facing a direction of movement of a fluid flowing in the conduit is closed.

15. The radiant tube according to claim 4, wherein the heat transfer promoter has a cavity inside, and the cavity has a shape in which a surface facing a direction of movement of a fluid flowing in the conduit is closed.

16. The radiant tube according to claim 5, wherein the heat transfer promoter has a cavity inside, and the cavity has a shape in which a surface facing a direction of movement of a fluid flowing in the conduit is closed.

17. The radiant tube according to claim 1, wherein an opening cross section of the conduit portion where the heat transfer promoter is disposed is an oval.

18. The radiant tube according to claim 2, wherein an opening cross section of the conduit portion where the heat transfer promoter is disposed is an oval.

19. The radiant tube according to claim 3, wherein an opening cross section of the conduit portion where the heat transfer promoter is disposed is an oval.

20. The radiant tube according to claim 4, wherein an opening cross section of the conduit portion where the heat transfer promoter is disposed is an oval.

* * * * *